United States Patent [19]

Fischer

[11] Patent Number: 4,747,271
[45] Date of Patent: May 31, 1988

[54] HYDRAULIC EXTERNAL HEAT SOURCE ENGINE

[75] Inventor: Victor H. Fischer, Las Vegas, Nev.

[73] Assignee: VHF Corporation, Las Vegas, Nev.

[21] Appl. No.: 887,541

[22] Filed: Jul. 18, 1986

[51] Int. Cl.⁴ .............................................. F01K 25/04
[52] U.S. Cl. ....................................... 60/670; 60/650; 60/682
[58] Field of Search ................. 60/530, 531, 650, 682, 60/670, 651, 671

[56] References Cited

U.S. PATENT DOCUMENTS

| | | | |
|---|---|---|---|
| 1,032,236 | 7/1912 | Patten | 60/650 |
| 1,746,158 | 2/1930 | Loffler . | |
| 1,778,817 | 10/1930 | Spiro . | |
| 2,094,621 | 10/1937 | Savage . | |
| 2,429,035 | 10/1947 | Steving . | |
| 2,830,435 | 4/1958 | Mallory . | |
| 2,839,888 | 6/1958 | Mallory . | |
| 2,867,975 | 1/1959 | Mallory . | |
| 2,984,067 | 5/1961 | Morris . | |
| 3,055,170 | 9/1962 | Westcott, Jr. | 60/682 |
| 3,192,705 | 7/1965 | Miller . | |
| 3,251,183 | 5/1966 | Whitlow . | |
| 3,599,425 | 8/1971 | Lewis . | |
| 3,609,965 | 10/1971 | Hercher . | |
| 3,905,195 | 9/1975 | Gregory . | |
| 3,956,894 | 5/1976 | Tibbs . | |
| 3,972,194 | 8/1976 | Eskeli . | |
| 4,004,421 | 1/1977 | Cowans . | |
| 4,055,951 | 11/1977 | Davoud . | |
| 4,077,214 | 3/1978 | Burke . | |
| 4,107,928 | 8/1978 | Kelly et al. | 60/650 |
| 4,109,468 | 8/1978 | Heath . | |
| 4,195,481 | 4/1980 | Gregory . | |
| 4,220,005 | 9/1980 | Cutts . | |
| 4,393,653 | 7/1983 | Fischer . | |
| 4,426,847 | 1/1984 | Fischer . | |
| 4,432,203 | 2/1984 | Fischer . | |
| 4,437,308 | 3/1984 | Fischer . | |
| 4,637,211 | 1/1987 | White et al. | 60/650 |

FOREIGN PATENT DOCUMENTS

| | | |
|---|---|---|
| 617649 | 8/1935 | Fed. Rep. of Germany . |
| 689961 | 3/1940 | Fed. Rep. of Germany . |
| 1953874 | 5/1971 | Fed. Rep. of Germany . |
| 2325279 | 1/1975 | Fed. Rep. of Germany . |
| 2329020 | 1/1975 | Fed. Rep. of Germany . |
| 2364930 | 7/1975 | Fed. Rep. of Germany . |
| 2405380 | 8/1975 | Fed. Rep. of Germany . |
| 2416964 | 10/1975 | Fed. Rep. of Germany . |
| 447111 | 5/1936 | United Kingdom . |
| 1257798 | 12/1971 | United Kingdom . |
| 1352510 | 5/1974 | United Kingdom . |
| 1524268 | 9/1978 | United Kingdom . |

Primary Examiner—Allen M. Ostrager
Attorney, Agent, or Firm—Christie, Parker & Hale

[57] ABSTRACT

A hydraulic external heat source engine wherein energy is supplied to a working end space of the engine by direct application of pressurized and heated liquid working fluid to the piston within a cylinder. The power stroke utilizes expanded hot liquid as the primary pressure source. After fluid intake cut-off, some of the heated liquid spontaneously vaporizes, thereby continuing to drive the working piston. The exhaust liquid working fluid discharged from the cylinder is recycled to an external preheat exchanger for preheating cold compressed working fluid expelled from the pump end space of the engine. The majority of the vapor produced within the cylinder recondenses within the cylinder and is discharged as liquid. The small amount of vapor that is discharged from the cylinder is condensed in an expansion chamber in the preheat exchanger. The preheated fluid is heated to operating temperature and pressure in a primary heat exchanger before being recycled into the working end space. The cooled exhaust fluid in the preheat exchanger is passed through a cold reservoir exchanger for further cooling before introduction into the pump end space. The engine is large and is well suited to stationary applications using low-grade heat sources such as solar, geothermal, and waste heat to supply heat to primary heat exchanger.

35 Claims, 10 Drawing Sheets

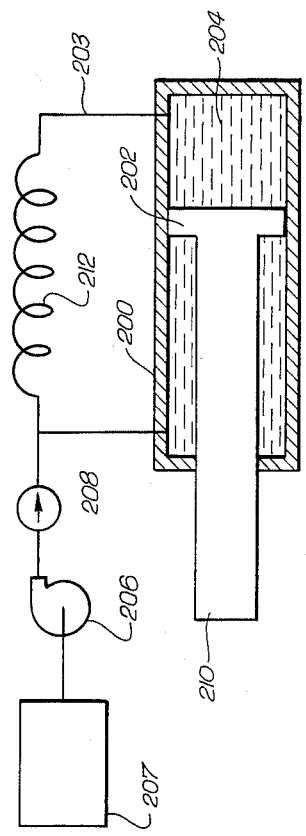
Fig. 2
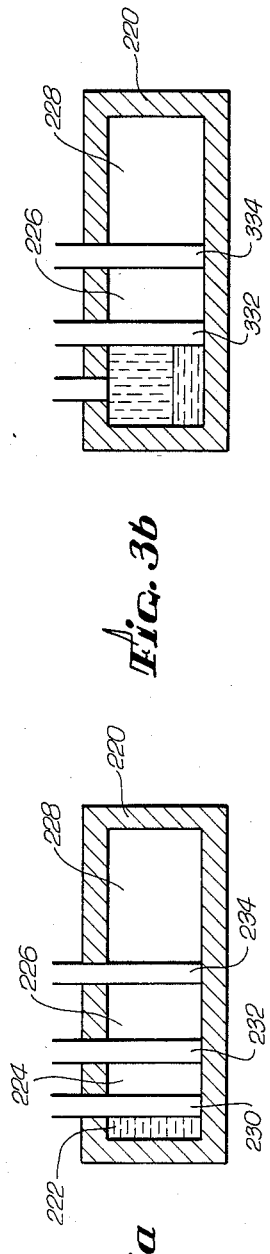
Fig. 3a
Fig. 3b
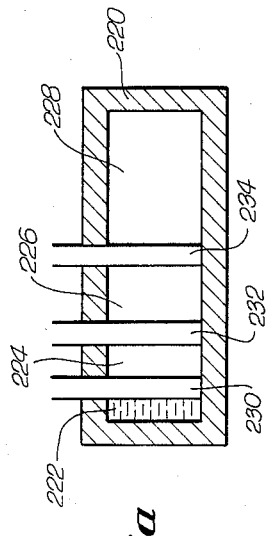
Fig. 3c
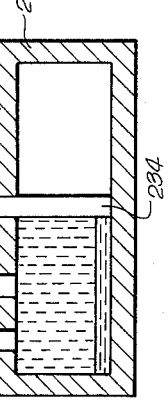
Fig. 3d

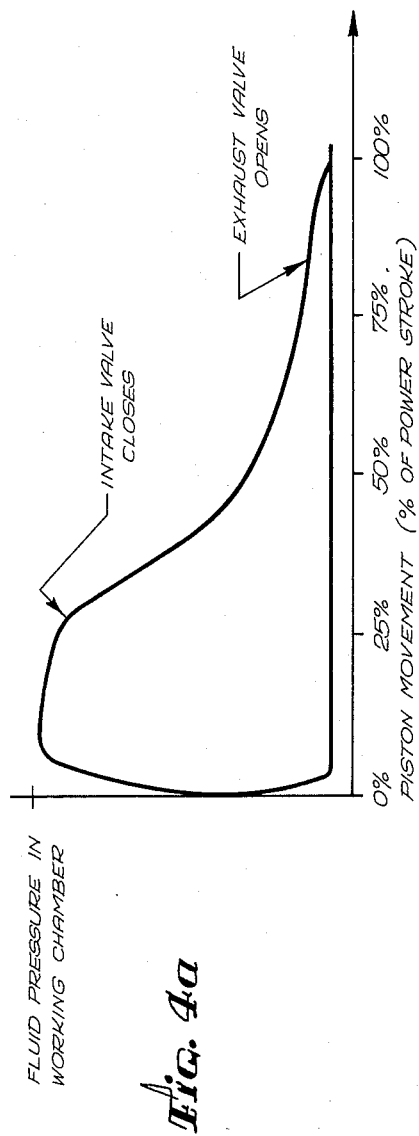
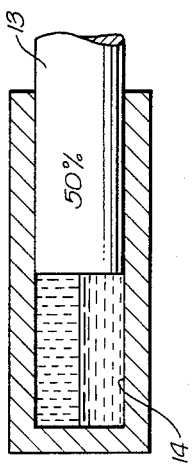
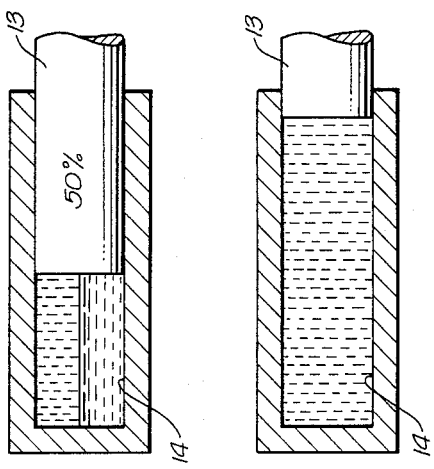
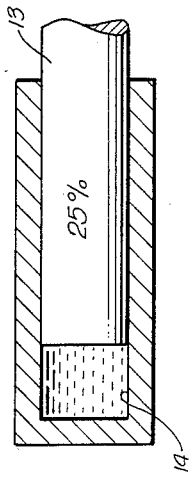
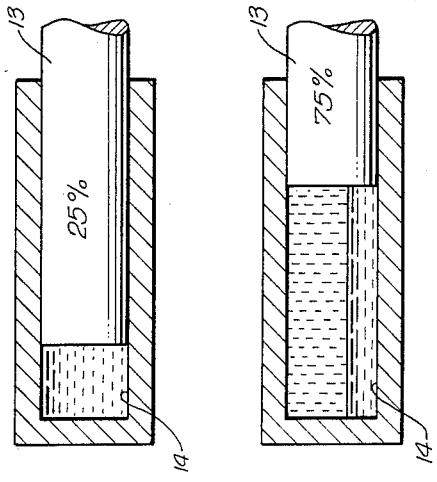
Fig. 4a
Fig. 4b
Fig. 4c
Fig. 4d
Fig. 4e

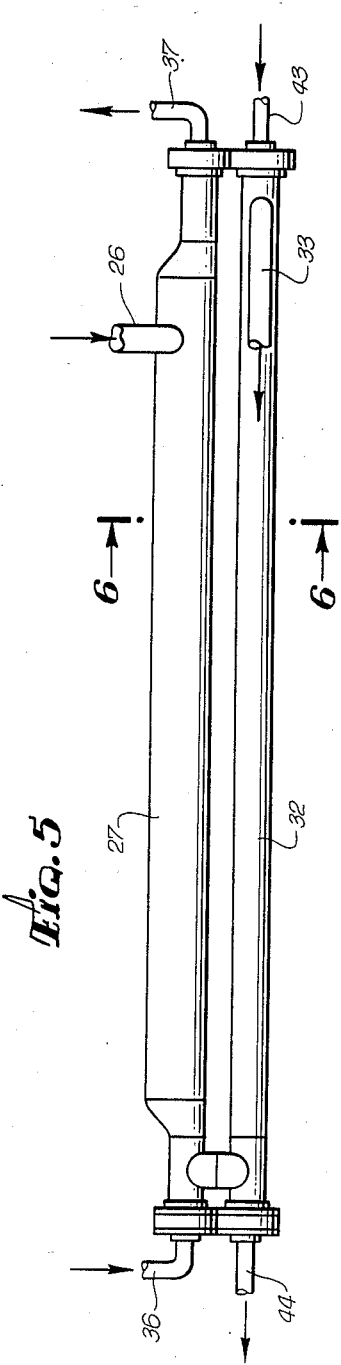
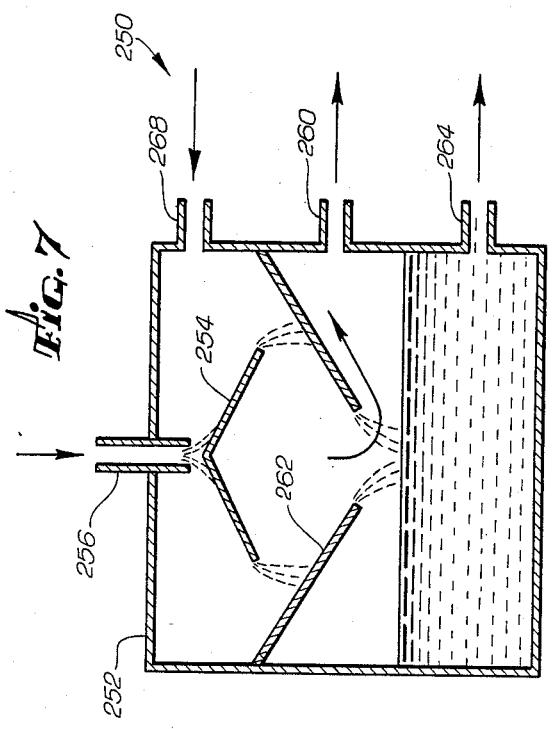
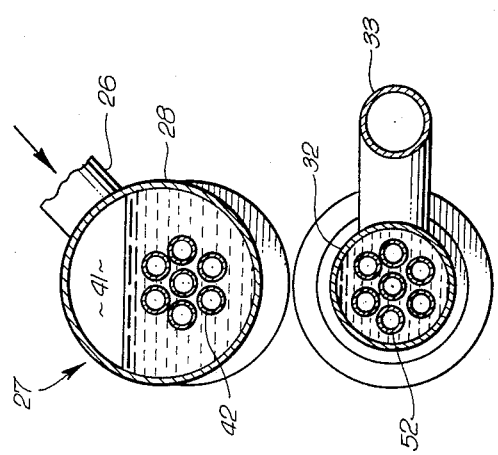

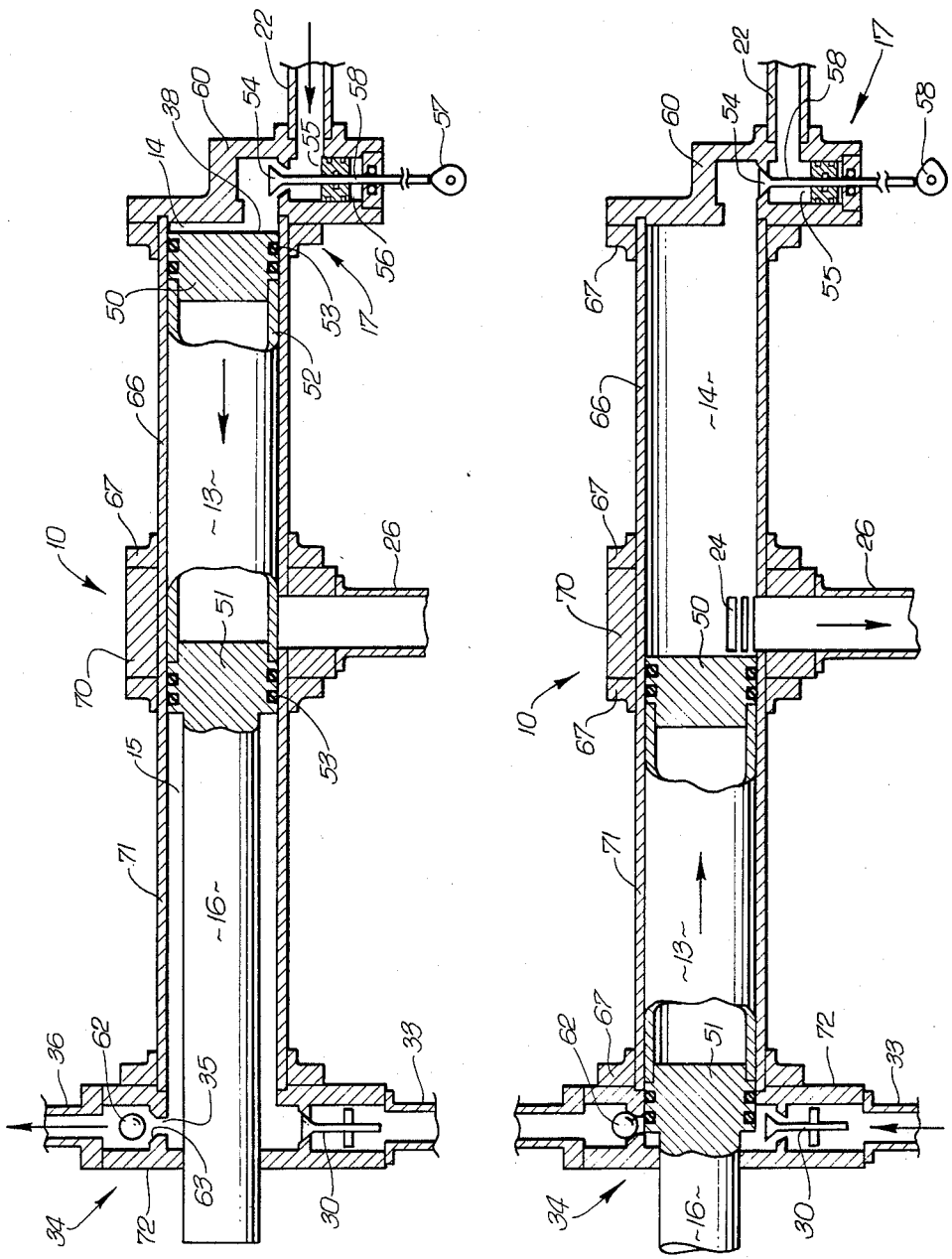

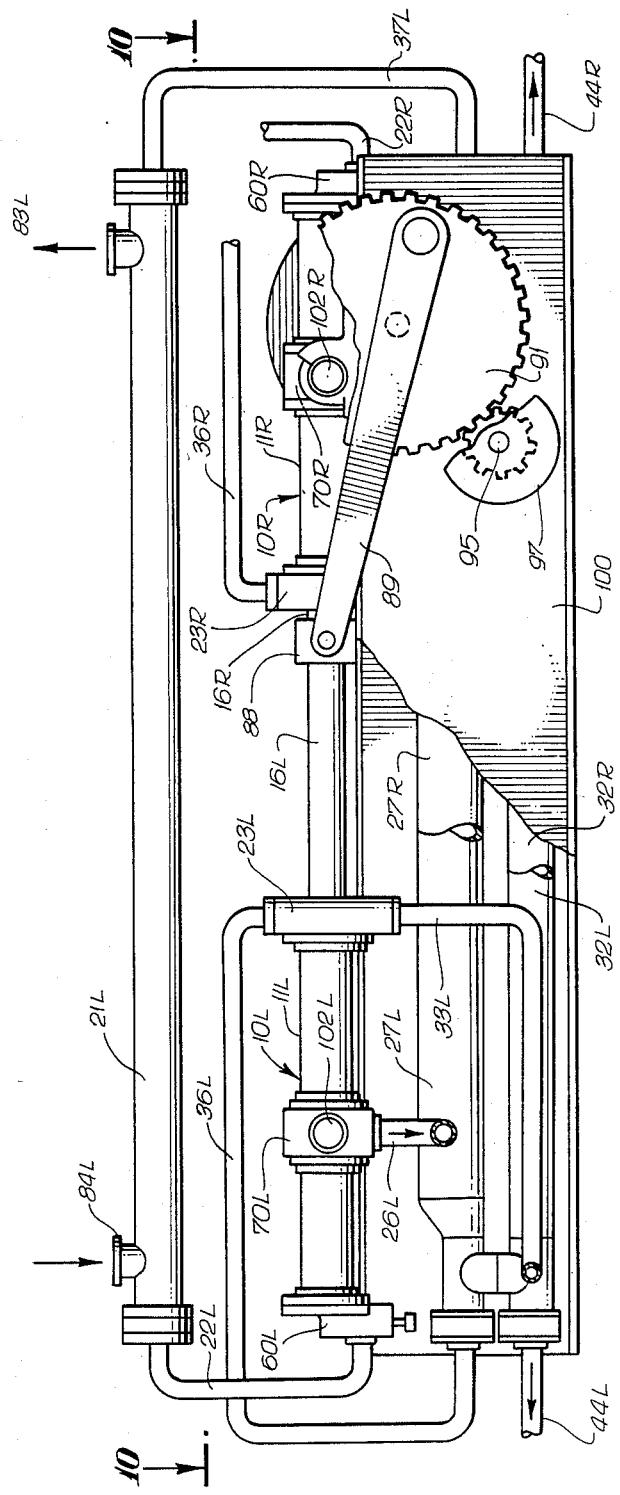

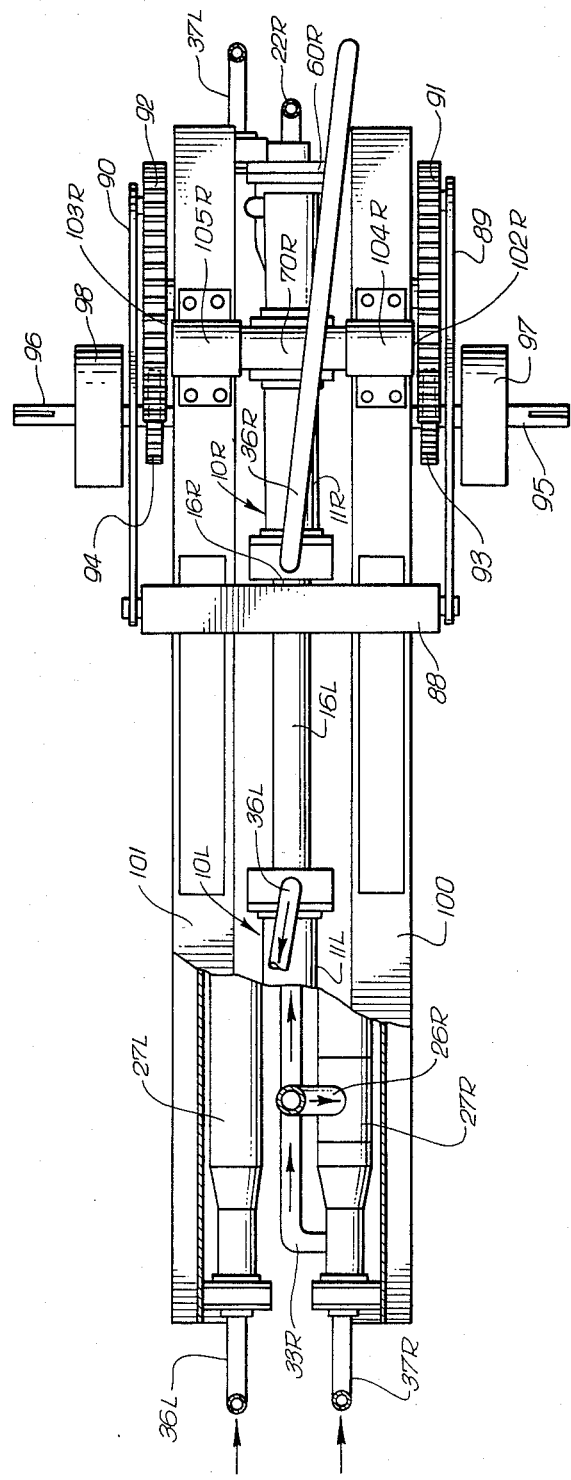

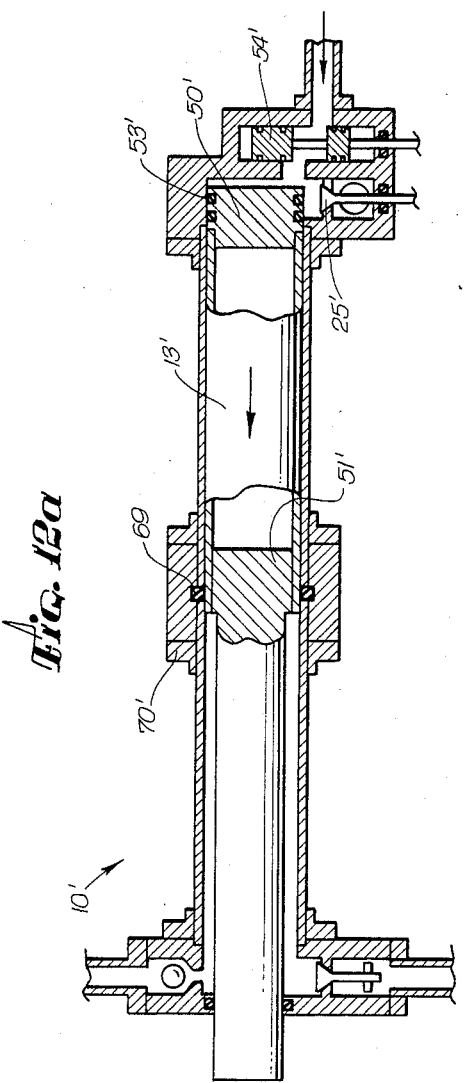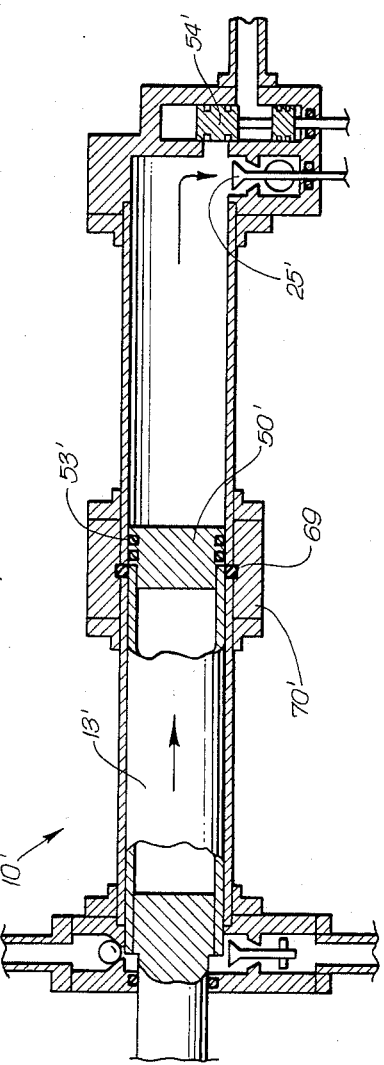

HYDRAULIC EXTERNAL HEAT SOURCE ENGINE

BACKGROUND OF THE INVENTION

This invention is directed to an improved engine having an external heat source and particularly to an engine which is driven by hot, pressurized liquid working fluid, such as water, which is volatilizable at the working temperatures and pressures.

Many attempts have been made to produce an engine which utilizes an external heat source to convert heat energy into useful work. The most notable external heat source engine designs utilizing vapor as the working fluid are the Rankine engine, the reciprocating steam engine, and the steam turbine. The Carnot engine, the Joule-Brayton engine and the Stirling engine are examples of external heat source engines utilizing gas as the working fluid. While these engine designs have been the subject of much theoretical considerations, they have not met with any significant commercial success other than the steam reciprocating engine and the steam turbine. The lack of commercial success has been due largely to the problem of providing small and efficient heat exhangers which facilitate the rapid and efficient heating of working fluid by an external heat source.

What has been needed and heretofore has been unavailable is an efficient energy conversion system which may be used with low grade heat sources. The present invention satisfies this need.

SUMMARY OF THE INVENTION

The present invention relates to a hydraulic reciprocating external heat source engine, i.e., an engine of the type having a cylinder or cylinders whose reciprocating motion provides a source of power and wherein the heat energy powering the engine is acquired outside the cylinder.

In particular, this invention utilizes an innovative operating cycle. A conventional internal combustion engine and turbine are classified as gas heat engines. A steam engine and turbine are classified as vapor heat engines. The present invention is classified as a hydraulic heat engine. Fundamentally, a steam engine uses a boiler to produce vapor (a gas surrogate) which moves a pneumatic motor. The boiler is a gas compressor substitute. The present invention uses a heat exchanger to heat liquid and produce increased liquid volume and pressure which moves a hydraulic motor. The heat exchanger is a hydraulic pump substitute.

For the purpose of definition herein, the term gas is assumed to be an idealized substance which is defined by the following equation of state: $pv/T = \text{constant}$. All substances tend towards a perfect gas at very high superheat. Substances normally thought of as gases (e.g. oxygen, nitrogen, hydrogen, etc.) are superheated at normal atmospheric temperature of 294° K. (530° R.) and pressure of 1.01325 bars (1 atmosphere). The critical temperatures of oxygen, nitrogen, and hydrogen are approximately 154° K. (278° R.), 126° K. (227° R.), and 33° K. (60° R.) respectively. Substances normally existing as vapors must be raised to very high temperatures before they behave according to the laws of a perfect gas. For example, the critical temperatures of ammonia, Freon 12, and water vapor and 406° K. (730° R.), 385° K. (693° R.), and 647° K. (1,165° R.) respectively.

The working fluid for a practical engine is either a substance which approximates a perfect gas, e.g. air, or a substance which exists mainly as liquid and vapor, e.g. steam and the refrigerant vapors such as ammonia, freon, methyl chloride, etc. Substances which approximate a perfect gas behave according to certain gas laws which relate to their thermodynamic properties. However, the properties of substances within the liquid and vapor phases are not related by definite laws, and values of their individual equilibrium thermodynamic properties must be determined empiricaly and listed in tables, such as the steam tables, refrigerant tables, etc.

The present invention provides a reciprocating external heat source engine in which the heat energy is supplied to a working end space of the engine by means of a liquid working fluid.

The external heat source engine of the present invention includes a double-acting cylinder having a piston therein defining on one side of the piston (usually the rod-end side) a pump end space, and on the other side of the piston a working end space. However, this would not preclude use of mechanical equivalents to this arrangement, for example the use of two cylinders coupled to a common shaft in which one of the cylinders provides by its piston the pumping end space and the other of the cylinders provides by its separate working piston the working end space.

The engine of the present invention may also comprise a pair of opposed working pistons reciprocating within a common cylinder, such that the working end spaces are defined by the two piston crowns and the cylinder walls.

The present invention may also be used in a rotary configuration, in which a positive displacement rotary vane or gear device having a stator and rotor defines a working space of variable volume.

Various inlet and outlet valves of conventional construction are provided as necessary, and may be in the form of check valves or poppet valves driven by a cam or in the form of rotary valves driven by a timing chain operated from the engine.

Preferably, the liquid working fluid used in the present invention is heated to a high pressure and high temperature, i.e. to high internal energy, by means of a liquid-liquid countercurrent flow small bore tube-in-shell heat exchanger. Because such small bore tubing can withstand high pressures, it is usually possible to heat the liquid working fluid up to its critical point.

A high temperature liquid heat transfer medium, e.g. Dowtherm, Therminol, inorganic salts, mercury, mineral oils, silicon compounds, sodium alloys, water, etc., supplied into the outer pipe shell of the primary heat exchanger, preferably obtains its heat energy from any of various waste heat energy sources, such as refineries, steel mills, power plants, smelters, foundries, etc., by the use of conventional gas-liquid heat exchangers. However, this does not preclude burning combustible fuels in a conventional liquid heating furnace to heat the liquid heat transfer medium. The fuel burnt in the furnace may be chosen from known combustible fuels such as gasolines, fuel oils, liquified or gaseous hydrocarbons, alcohols, wood, coal, coke, charcoal, or waste combustibles.

The working fluid used in the present invention is a vaporizable liquid such as water or a refrigerant. It is desirable that the working fluid have a high thermal conductivity to maximize heat transfer within the primary heat exchanger. The working fluid is preferably selected from water, refrigerants, and oil or mixtures thereof. A water or refrigerant working fluid may be mixed with an oil as an emulsion, dispersion, or solution to provide lubrication for the engine. The mixing may occur internally or externally of the working end spaces. If desired, the working space may contain vaporizable working fluid which is vaporised by injection of a heated liquid substance which is not vaporizable.

For special applications where the rate of heat transfer must be high within the cylinder, it may be desirable to heat the working fluid to a temperature and pressure above its critical point.

Inlet valves are used to regulate transfer of the pressurized heat liquid working fluid into the working end space of the cylinder. The highly pressurized heated liquid working fluid from the primary heat exchanger is applied directly to the piston in the working end space. During operation of the engine, the liquid working fluid will partially vaporize in the working end space after transfer of the liquid working fluid has been cut-off. This vapor will continue to apply pressure on the piston during the remainder of the power stroke.

The vapor pressure in the working space at bottom dead center (BDC) generally will be less than atmospheric pressure because the liquid working fluid is discharged through the outlet exhaust valve. The vapor pressure at near top dead center (TDC), before the inlet valve opens, is approximately one atmosphere (1 bar). Because the vapor pressure at TDC is not determined by the compression ratio as is the case with a perfect gas, very high compression ratios above 30:1 are preferred with this invention. The engine of the present invention preferably has a bore:stroke ratio from 0.5:3 to 2:3.

During operation of the present invention, the liquid working fluid from the working space is discharged into an expansion chamber contained within the shell pipe of a preheat exchanger. The high pressure liquid working fluid from the pump end space is discharged into small bore tube bundles in a counter-current flow liquid-liquid heat exchanger in the preheat exchanger to preheat the cooled pressurized liquid working fluid from the pump end space prior to its being transferred into the small bore tube bundles in the primary heat exchanger.

The liquid working fluid discharged from the shell pipe of the preheat exchanger is transferred into the shell pipe of a cold reservoir heat exchanger or an air-cooled gas-liquid radiator to further lower the temperature of the liquid working fluid and thereby reduce the specific volume of the liquid prior to its intake into the pump end space. Small bore tube bundles in the cold reservoir heat exchanger contain recirculating low temperature heat transfer medium which is pumped through a low temperature external heat exchanger. This low temperature external heat exchanger may be air-cooled or liquid-evaporator cooled. The power output of the present invention can be controlled by regulating the temperature of the cold reservoir to increase or decrease the specific volume of liquid working fluid introduced into the pump end space. These changes in the specific volume of the intake liquid working fluid alter the efficiency of the power stroke.

The present invention is to be distinguished from a steam engine in that the working fluid in the present invention is pressurized and maintained in its liquid state during a substantial portion of the power stroke. Also, in the present invention, the working fluid discharged from the working space after the power stroke is predominantly in the liquid state. This is in sharp contrast to a steam engine in which the working fluid is vaporized in a boiler prior to being transferred into and discharged from the cylinder. Because water droplets must not form in the discharge steam vapor of a conventional steam engine, the steam vapor must be superheated. The requirement for super-heating is extremely important for proper operation of steam turbines but it increases both the construction and the operating costs of a steam boiler.

In the Rankine Cycle of the vaporization process, the boiler represents a theoretical limit on the efficiency of a steam engine. The latent heat of vaporization energy must be rejected, as waste heat, before liquid water is condensed from discharged steam vapor. Such external condensation of and consequent loss of the heat of vaporization energy is obviated by the present invention.

The working fluid in the primary heat exchanger may be maintained in the liquid state by using appropriate sensors to ensure that the temperature at a given pressure never exceeds the liquid boiling point. However, it has been found that if the primary heat exchanger and pump system are precharged at an elevated pressure, the system pressure will exceed the boiling point as the liquid working fluid is heated and expands. Thus, by correct choice of precharge pressure and control of the duration of the inlet valve prior to cut-off, complex temperature and pressure sensing and control devices may be avoided.

The rate at which the engine does work may be controlled by any of several means. It may be controlled by varying the specific volume of liquid working fluid transferred into the working end space, for example, by controlling the inlet temperature of the fluid. This can be accomplished by controlling the flow rate and/or the temperature of the heat transfer medium in the primary heat exchanger. The engine can also be controlled by the rate of heat transfer from the primary heat energy source to the heat transfer medium, for example, by controlling a diverter valve or by controlling the fuel supply when using a furnace.

Usually, the heat transfer medium is recovered after it has been through the countercurrent flow heat exchanger. The heat transfer medium is still somewhat heated and can be recycled to the primary heat energy source or can continue into another primary heat exchanger for another engine utilizing a lower temperature working fluid. This process of cascading from one working fluid to another is analogous to a compound steam engine. For example, a high temperature primary heat transfer medium could be initially applied to a heat exchanger and cylinder combination utilizing water as its working fluid. The discharged primary heat transfer medium could then be further applied to a second heat exchanger and cylinder combination utilizing ammonia as its working fluid. The discharged primary heat transfer medium could then be further applied to a third heat exchanger and cylinder combination utilizing freon as its working fluid. Finally, the discharge primary heat transfer medium would then be returned to the primary heat energy source for reheating and recycling.

It is generally desirable to use various heat recovery means with the present invention. Thus, the whole engine may be enclosed in a heat insulating enclosure and be provided with heat exchangers to pick-up stray heat and transfer it, for example, to preheat the working fluid. It is also desirable to recover the heat remaining in the furnace flue gases. This may be achieved by passing the flue gases through a spray chamber in which a stream of liquid (generally water) is sprayed through the flue gases. It is preferred that the liquid heat transfer medium sprayed be heated close to its boiling point prior to being passed on to the heat exchanger. Moreover, the use of a water spray chamber is advantageous because the combination water from the furnace may be also condensed out of the flue gases.

The construction of an engine according to the present invention is considerably simpler, in certain respects, than known engines such as internal combustion engines. The temperatures encountered in the working spaces are generally lower in the present invention so that problems of lubrication and sealing around pistons are simplified. It will be appreciated that power may be provided in the engine of the present invention at lower temperatures than, for example, an internal combustion engine. Moreover, the internal combustion engine cylinders require complex cooling techniques and apparatus which are not required with the present invention.

Because the temperatures encounterd in the engine of the present invention are relatively low, it is possible but not necessary to use metal cylinders. Plastics such as polytetrafluroethylene (PTFE), fiber-reinforced composite resins, and other plastics used in engineering, are particularly advantageous for use in the cylinders of the present invention because of their inexpensiveness an ease of use. Other heat insulating materials such as wood, concrete, glass, or ceramics may also be used.

In summary, the present invention is an engine in which hot pressurized liquid is transferred into the working end space and is transferred to the pump end space after the working fluid liquid has been cooled and prior to its being reheated, in a double-acting working stroke.

Power may be taken from the engine of the present invention by means of a piston rod attached to the reciprocating working piston. The free end of the piston rod may be connected to an eccentric shaft on a rotary flywheel or to a crankshaft to convert the reciprocating motion into rotary motion.

Although the invention has been described in relation to an engine having a single cylinder, it will be appreciated that multicylinder engines may also be used in which each cylinder would have its own group of heat exchangers.

In a preferred embodiment, the engine of the present invention comprises a housing having an internal chamber, a working element disposed within the internal chamber defining therein a working chamber, and means to direct hot, pressurized, volatilizable working fluid in the liquid state into the working chamber to drive the working element from a first position towards a second position, and means for terminating the flow of the liquid working fluid into the working chamber when the working element has been driven a portion of the distance from the first position to the second position. Upon the termination of fluid flow, the liquid working fluid within the working chamber partially vaporizes and the expanding vapor drives the working element through the remainder of a power stroke. At or near the end of the power stroke, when the working element approaches the second position, working fluid is discharged from the working chamber. Means are provided to return the working element to its initial position within the working chamber at the completion of the cycle so that the power stroke can be repeated.

In a preferred embodiment, the working element is a double-acting piston which reciprocates within a cylindrical chamber to define therein a working chamber at one end of the cylinder and a pump chamber on the other end of the cylinder.

In accordance with a preferred embodiment, hot, pressurized, volatilizable working fluid in the liquid state, at a temperature preferably not greater than its critical temperature, is introduced into the working chamber through an intake valve and port where it presses directly against the working face of the piston to drive the piston toward the pump end of the cylinder and thereby expand the working chamber. After the piston has travelled a significant part of the power stroke, i.e., 25 to 50 percent, the flow of the liquid working fluid into the working chamber is terminated by closing the intake valve. The hot liquid within the working chamber vaporizes in part and the expanding vapors drive the piston through the remainder of the power stroke. At or before the time the piston reaches bottom dead center (BDC) in the working chamber, the working fluid is discharged from the working chamber through an exhaust port and an exhaust valve. After reaching bottom dead center, the reciprocating piston is returned to top dead center and the cycle is repeated.

In the pump side of the preferred engine housing, low temperature, low pressure liquid working fluid from a cold reservoir is introduced into the pump chamber through an intake port and intake valve during an intake cycle until the working side of the piston is at top dead center in the working chamber. The intake valve is then closed to terminate the flow of low temperature liquid working fluid into the pump chamber. On the power stroke, the low temperature liquid working fluid in the pump chamber is compressed until the pressure thereof exceeds system pressure at which time an exhaust valve opens to discharge the pressurized low temperature working fluid through an exhaust port.

The pressurized liquid working fluid from the pump chamber is directed to a preheat exchanger in which the exhaust working fluid from the working chamber is used to heat the pressurized liquid working fluid. The heated, high pressure liquid working fluid is then passed to a primary heat exchanger where the temperature and pressure of the liquid working fluid is raised to operating levels for introducing into the working chamber during the power stroke.

The heat exchanger medium used in the primary heat exchanger may receive its energy from any source. It is contemplated that such source may be a low grade heat source so that normally unusable heat energy may be converted into useful mechanical energy by the present invention. Additionally, because the temperatures and pressures of the working fluid in the present invention are not excessively high, simple designs and inexpensive materials of construction can be used in the manufacture of the engine and its associated components. Moreover, there is usually no requirement for complicated engine cooling systems.

These and other further objects and features of the invention will become apparent from the disclosure which includes the above and below specifications and claims and drawings.

BRIEF DESCRIPTION OF THE DRAWINGS

FIG. 2 is a schematic diagram illustrating the principle of operation of the power stroke of the engine shown in FIG. 1;

FIGS. 3a-3d are the schematic diagrams of a two-phase closed system illustrating the principle of free expansion used in the engine shown in FIG. 1;

FIG. 4a is a graphical representation of the relationship of working chamber pressure to piston travel in the power stroke;

FIGS. 4b-4e are schematic diagrams illustrating the concept depicted in FIG. 4 as applied to the engine shown in FIG. 1;

FIG. 5 is a side elevation view of one embodiment of a preheat exchanger and cold reservoir exchanger usable with the engine shown in FIG. 1;

FIG. 6 is a cross-sectional view taken along the lines 6—6 shown in FIG. 5;

FIG. 7 is a schematic diagram of a separator device for extracting sensible heat and pollutants from flue gas;

FIGS. 8a and 8b are sectional views, partly broken away, of an engine embodying features of the invention;

FIG. 9 is a side elevational view, partially broken away, of a dual opposed engine arrangement utilizing the engine shown in FIGS. 8a and 8b;

FIG. 10 is a plan view, partly broken away, of the arrangement shown in FIG. 9;

FIGS. 12a and 12b are sectional views of an alternative embodiment of the engine shown in FIGS. 8a and 8b.

DESCRIPTION OF THE PREFERRED EMBODIMENTS

Figure 1:
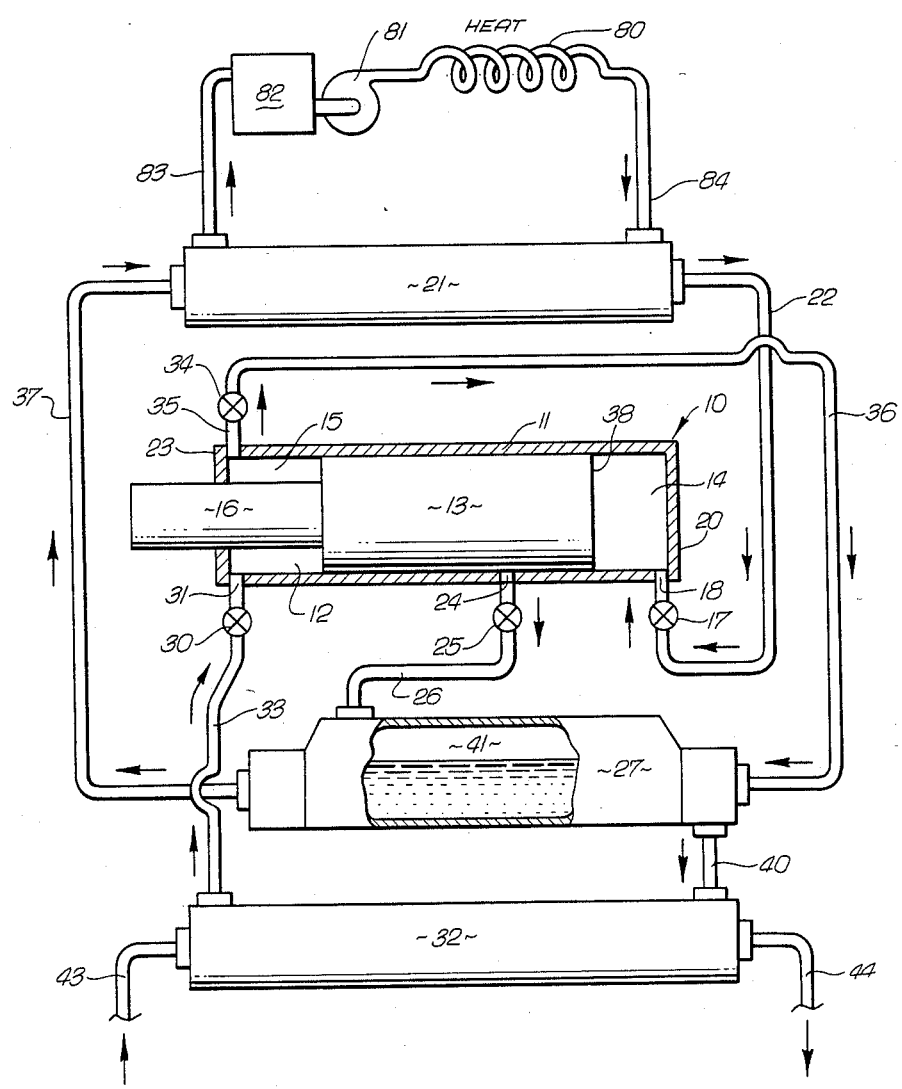
FIG. 1 is a schematic diagram of an engine embodying features of the invention.

As shown in FIG. 1, the external heat source hydraulic engine 10 of the present invention comprises a cylinder 11 having piston 13 disposed therein defining a pump end space 15, and a working end space 14, a primary heat exchanger 21 for heating and pressurizing the liquid working fluid, an expansion chamber 41 in a preheat exchanger 27 for accepting exhaust working fluid and both preheating the pressurized working fluid prior to its introduction into the primary heat exchanger 21 and condensing the exhaust vapor, a cold reservoir heat exchanger 32 to cool the liquid working fluid and maximize its density prior to its pressurization in the pump end 15 of the cylinder 11.

Prior to a detailed explanation the operation of the engine 10, it may be helpful to discuss some of the fundamental concepts of operation, paying particular attention to pressure, temperature, and work.

FIG. 2 shows a double-acting cylinder 200 in which both sides of the piston 202 are in fluid communication with each other via a conduit 203. The cylinder 200 is filled with a liquid 204. The piston 202 is in a state of "hydraulic lock" which means that it cannot move or be moved. If a fluid pump 206 is turned-on, and fluid from a reservoir 207 is supplied to the right hand end of the cylinder 200 through check valve 208, the piston 202 will move to the left and extend itself until it has moved full stroke. If pump 206 stops supplying fluid to cylinder 200 before the end of the stroke, piston 202 will stop and again be in a state of "hydraulic lock". The total force which can be produced by piston 202 is limited to the area of piston rod 210 times the pressure generated by the pump 206 because the area of the rod-end side of the piston 202 counteracts the opposing area on the opposite side of the piston 202, leaving the area of piston rod 210 unopposed. Hence, a large area piston rod 210 is desireable.

FIG. 2 shows a coil 212 in the conduit 203 which can be externally heated. If the piston 202 is in the position shown with the pump 206 turned off, heat applied to the coil 212 which includes the liquid 204 will cause the piston 202 to again move to the left and extend itself until it has moved full stroke. Again, as in the case of using pump 206, the total force which can be produced by piston 202 is limited to the area of piston rod 210 times the pressure generated by the expansion of fluid 204 due to the applied heat. Because the heat can cause piston 202 to move and produce a force, work is produced. The innovative operating cycle of the present invention applies this principle of utilizing expanded fluid volume and pressure generation.

FIGS. 3a-3d show a closed system defined as an insulated vessel 220 divided into four compartments 222, 224, 226 and 228 by three siding partitions 230, 232 and 234, and containing water as the fluid. The first compartment 222 contains, for example, 20 grams of water pressurized to 100 bars and heated to 310° C. At 100 bars of pressure, the water will not boil or vaporize at 310° C. The other compartments are empty. When the partitions 230, 232 and 234 are withdrawn in sequence, the liquid moves sequentially into new environments, and the vapor undergoes an expansion process which is not restrained in any way by an opposing mechanical force. The process is called a "Free Expansion" because no work is done.

FIGS. 3a-3d show the change in states after the partitions 230, 232 and 234 are lifted and the mass of water has settled into each new state of equilibrium. According to the First Law of Thermodynamics, the internal energy of heated fluid will be conserved even after partial vaporization occurs during an expansion into larger environments. FIG. 3b shows the first partition 230 has been lifted and the 20 grams of pressurized and heated water has moved into a volume of 100 cc thereby having a specific volume of 5 cc/gram (100/20). The water temperature within the compartment is lowered by the vaporization process to approximately 275° C. and the pressure is lowered to 60 bars.

In FIG. 3c, the second partition 232 has been lifted and the original 20 grams of water again moves into a new compartment which has a total volume of 200 cc. The new specific volume is 10 cc/gram (200/20). The equilibrium water temperature is now approximately 250° C. and the pressure is approximately 40 bars. Finally, in FIG. 3d, the last partition 234 has been lifted, and the total vessel 220 has the 20 grams of water contained within a volume of 400 cc. The specific volume is 20 cc/gram (400/20). The final water temperature is approximately 223° C. and the vapor pressure is approximately 25 bars.

In the foregoing example, the water temperature is lowered by the vaporization process of filling the expanding volumes. Because the temperature of the water decreases, the pressure within the vessel 220 also decreases during the free expansion process. As the vapor mass increases, the liquid mass decreases because the total mass and the total internal energy of the water must remain constant.

This process of liquid vaporization in free expansion as described above is unique when compared to a perfect gas. James P. Joule demonstrated that gases act differently during the free expansion process. Joule's Law states that when a perfect gas expands without doing external work and without taking in or giving out any heat, its temperature remains unchanged and there is no change in its internal energy. Joule's experimental apparatus was fundamentally similar to the "free expansion" apparatus illustrated in FIGS. 3a–d. Therefore, it can be appreciated that the properties of fluids in the liquid vapor phases are not dictated by the laws and assumptions for a perfect gas.

Referring now to FIG. 1, the two-phase reciprocating external heat source engine 10 generally comprises a cylinder 11 with an elongated internal chamber 12 having disposed therein a working element or piston 13 adapted for reciprocating movement within the chamber 12. The piston 13 separates the chamber 12 into a working end space or chamber 14 at one end and a pump end space or chamber 15 on the other end of the cylinder 11. A piston rod 16 is connected to piston 13 to transmit the reciprocating motion thereof to an external device (not shown). Intake valve 17 and intake port 18 associated with the working end 20 of cylinder 11 are provided to direct hot, pressurized liquid working fluid from a primary heat exchanger 21 through conduit 22 into the working chamber 14. In the preferred embodiment, the working fluid from the primary heat exchanger 21 is water at an approximate maximum temperature of about 370° C. and a pressure of about 220 bars. The heated and pressurized liquid working fluid drives the piston 13 toward the pump end 23 of cylinder 11. Exhaust port 24 is provided in working end 20 and an exhaust valve 25 is associated therewith to discharge the working fluid from the working chamber 14 through conduit 26 to an expansion chamber 41 of a preheat exchanger 27.

Intake check valve 30 and intake port 31 are provided on the pump end 23 of the cylinder 11 to direct cold dense liquid working fluid at approximately atmospheric temperature and pressure from cold reservoir heat exchanger 32 through conduit 33 into the pump chamber 15. The liquid working fluid is inducted into the pump chamber 15 by moving the piston 13 toward the working end 20 of cylinder 11 and thereby opening inlet check valve 30. The outlet from the chamber 15 is closed by an exhaust check valve 34. When the piston 13 has reached Top Dead Center, the inlet valve 30 closes. When the piston 13 is driven toward the pump end 23 by the high temperature, high pressure liquid working fluid, i.e., during the power cycle, the low temperature fluid in the pump chamber 15 is compressed until the pressure thereof exceeds system pressure, which causes the exhaust valve 34 to open and thereby allow the fluid to be discharged through exhaust port 35. The compressed, discharged fluid is then directed to preheat exchanger 27 through conduit 36. The hot working fluid exhausted from the working chamber 14 into the preheat exchanger 27 is used to preheat the compressed, low temperature liquid working fluid discharged from the pump chamber 15. The preheat exchanger 27 is preferably a shell and tube type heat exchanger with an excess volume to handle vapors discharged from the working chamber 14.

The high pressure preheated liquid working fluid from the preheat exchanger 27 is directed through conduit 37 to primary heat exchanger 21 where both the temperature and pressure of the liquid working fluid is brought up to desired operating levels. The duty cycle of the primary heat exchanger 21 is as follows: charging from pump end 15 50% while discharging to working end 14 approximately 12.5% to 25%, and heat expansion process 50% for each engine revolution. The primary heat exchanger 21 may be of conventional shell and tube design. The high temperature heating fluid used in the primary heat exchanger 21 may be from any convenient source, e.g., waste heat from an industrial or a natural source. Extremely high temperatures are not necessary with the present invention. The high temperature, high pressure liquid working fluid is directed from the primary heat exchanger 21 through conduit 22, intake valve 17 and, intake port 18 into the working chamber 14, as previously described.

FIG. 1 schematically illustrates a system for heating the heat transfer fluid for use in the primary heat exchanger 21. This system includes a heating coil 80, a recirculating pump 81, and a reservoir 82. Conduit 83 carries heat exchange fluid from the primary heat exchanger 21 to reservoir 82 and conduit 84 carries the heated fluid back to the primary heat exchanger 21. This illustration is used to demonstrate that the engine 10 of the present invention is an external heat source engine and is independent of the source or nature of the heat source. Any heating mechanism having suitable temperature raising capacity can be applied to the operation of this invention. Low grade heat sources including geothermal sources and waste heat may be utilized.

FIG. 7 shown an exemplary separating device 250 for heating the heat transfer fluid for the primary heat exchanger 21 and also for washing dirty exhaust flue gases from an exhaust stack (not shown). The device 250 includes a spray chamber 252 housing a cone 254 onto which heat transfer fluid is directed through spray nozzle 256. The stream of hot dirty flue gases introduced into the chamber 252 via inlet 258, flows tangentially around the chamber 252 before egressing through exit 260 as clean cooled flue gas. The flue gases thus pass through the spray of heat transfer fluid and then pass through a curtain of heat transfer fluid falling through the inside aperture of a funnel 262 positioned in the changer 252 below the cone 254. Preferably, the flue gases are cooled approximately 98° C.. The heat transfer fluid exists through outlet 264 before being fed to the recirculating pump 82 and the primary heat exchanger 21 shown in FIG. 1.

The external heat source engine 10 shown in FIG. 1 is operated in the following manner. At the start of the cycle, the piston 13 is located at a first position in the working chamber 14 at or near top dead center. The intake valve 17 is opened and hot, pressurized liquid working fluid from the primary heat exchanger 21 is directed through conduit 22 and intake port 18 into working chamber 14. The initial pressure which is applied to the working face 38 of the piston 13 will usually be higher than the pump pressure due to the heat expansion process occurring in the primary heat exchanger 21 during the approximately 50% time when both the pump check valve 34 and the inlet valve 17 are commonly closed. The high temperature, high pressure liquid working fluid presses directly against the working face 38 of piston 13 driving it from its first position at top dead center toward a second position within the working chamber 14, ie., the power stroke. When a significant amount of the piston movement through the power stroke has occurred, e.g., 25 to 50 percent of the stroke after Top Dead Center, the intake valve 17 closes and the liquid working fluid in the working chamber 14 begins the free expansion process discussed above. The vapors formed thereby continue to drive piston 13 through the remainder of its power stroke toward Bottom Dead Center as shown in FIGS. 4(b)–(e). In a preferred embodiment, the intake valve 17 is kept open until the inlet pressure is below the boiling pressure, thereby allowing a small quantity of vapor to be formed in the primary heat exchanger 21 to minimize water hammer, which occurs if the intake valve 17 is closed too rapidly. Optionally, a hydraulic accumulator (not shown) may be installed in conduit 22 between the primary heat exchanger 21 and the intake valve 17 to minimize the effects of water hammer.

When the piston 13 reaches approximately 10% before bottom dead center, exhaust valve 25 opens to allow the liquid and most of the vapor in working chamber 14 to exhaust through exhaust port 24 and conduit 26 into the shell of the preheat exchanger 27 where it is used to raise the temperature of the high pressure, low temperature liquid working fluid discharged from the pump chamber 15. The liquid working fluid is cooled and condensed as it passes through the preheat exchanger 27. It then passes through conduit 40 to the cold reservoir 32 where it is further cooled to increase its density before it is recycled through conduit 33 to the pump chamber 15.

As piston 13 travels in its return stroke to top dead center in the working chamber 14, low temperature, low pressure liquid working fluid from the cold reservoir 32 is drawn into the pump chamber 15 through intake valve 30 and intake port 31. At or near top dead center, the intake valve 30 closes and the reverse movement of the reciprocating piston during the power stroke increases the pressure of the liquid working fluid in the pump chamber 15. When the pressure has risen to exceed system pressure, exhaust valve 34 opens and the high pressure, low temperature working fluid is discharged through exhaust port 35 and conduit 36 to the preheat exchanger 27 where the temperature is raised by the exhausted fluid from working chamber 14. The pressurized liquid working fluid is directed from the primary heat exchanger 27 through conduit 37 to the primary heat exchanger 21 where the temperature and pressure of the working fluid are raised to operating levels.

FIG. 4(a) graphically illustrates the variation of working fluid pressure within the working chamber 14 with respect to the position of piston 13 during the power stroke. In the preferred embodiment, the vapor pressure within the working chamber 14 does not rise to a level significantly greater than one atmosphere during the return stroke, even though the compression ratio may exceed 30:1. This low compression pressure is due to many factors, including but not limited to, the effects of residual liquid droplets on the chamber walls 12 and the working face 38 of piston 13 during the return stroke from bottom dead center to top dead center and the very low vapor pressure remaining within the working chamber 14 after the majority of liquid working fluid is exhausted. This low vapor pressure is also observed in a typical uniflow design which is used in the preferred embodiment shown in FIGS. 8(a) and (b).

The four schematic diagrams FIGS. 4(b)–(e) represent the condition of the liquid and vapor in the working chamber 14 as the stroke of the piston 13 progresses from 25%, 50%, 75% after top dead center and finally to bottom dead center. It is to be noted that in the preferred embodiment of the present invention, the flow of pressurized liquid working fluid into the working chamber 14 is cut off at between 25% and 50% of top dead center and the liquid is exhausted from the chamber 14 at approximately 10% before bottom dead center.

A preferred preheat exchanger 27 shown in FIGS. 5 and 6 is a conventional shell 28 and tube 42 type heat exchanger provided with an expansion chamber 41 having a volume above the liquid level much larger than the mass of exhausted discharge working fluid so as to minimize the vapor pressure therein and aid in exhausting the working fluid from the working chamber 14. The hot exhausted liquid working fluid in chamber 41 heats the low temperature, high pressure liquid working fluid from pump chamber 15 passing through heat exchanger tubes 42.

FIG. 6 shows that the warm exhaust liquid working fluid is cooled by the cold liquid working fluid within the small bore tubes 42' contained in the preheat exchanger 27. The vapor pressure within the preheat exchanger shell 28 is determined by the lowest temperature of the liquid exhaust fluid exposed to the expansion chamber volume 41. Excess vapor will spontaneously condense when its vapor pressure exceeds the surface temperature of the liquid within the exchanger 27. Therefore, at the cold end of the preheat exchanger shell 28, the excess vapor will condense due to the cooling of the exhaust liquid by the cold working liquid working fluid from the cold reservoir exchanger 32. Since approximately 99% of the exhaust working fluid mass is in the liquid state, the residual 1% vapor mass is easily condensed within the preheat exchanger 27 without external condensing equipment.

The cooled exhausted liquid working fluid from chamber 41 of the preheat exchanger 27 is further cooled in the shell of a cold reservoir 32, which is essentially a conventional shell and tube type heat exchanger, so that low temperature, low pressure working fluid may be recycled to the pump chamber 15. This cooling process increases the density of the liquid working fluid so that a greater mass of the fluid can be brought into the pump chamber 15. The working fluid from chamber 41 of the preheat exchanger 27 passes through the cold reservoir 32 in heat exchange relationship with the cooling fluid passed into the cold reservoir 32 through conduit 43. Low temperature heat exchange fluid from a source (not shown) passes through the heat exchanger tubes 52.

FIGS. 8, 9, and 10 illustrate a practical form of the invention which is similar in principle to the embodiment shown schematically in FIG. 1 except that no specific external heat source, including burner, heating fluid, recirculating pump, or heating fluid reservoir is shown.

The engine 10 comprises two cylinders arranged in an opposing configuration. This embodiment permits the particularly simple cylinder construction shown in FIG. 8. The relatively low temperatures encountered allow the use of engineering plastics, ceramics, and glass materials in the construction of the cylinder, and indeed such materials have important low heat conductivity advantages.

FIGS. 8a and 8b illustrate in greater detail the engine shown in FIG. 1 in schematic form. The engine 10 includes a piston 13 with a working head 50 and a pump head 51 interconnected by a cylindrically shaped thermal spacer 52. Both piston heads 50 and 51 are provided with piston ring seals 53. The intake valve 17 is a cam-operated balanced poppet valve 54 having a balancing piston 55. When the poppet valve 54 is closed, the piston 55 has a larger piston area exposed to the high pressure working fluid in conduit 22 and therefore keeps the poppet valve 54 closed even at elevated fluid pressures. The backside chamber 56 of the piston 55 communicates via a drilled passage (not shown) with the working chamber 14 to maintain equal pressures. When the poppet valve 54 is closed, the working chamber 14 is usually at a lower pressure, whereas when the valve is open, the pressure is equal on both sides of the piston 55, minimizing the force which must be applied by the cam 57 to maintain the valve 54 open. Because the stem 58 of the poppet valve 54 passes outside the valve housing 60, there is a closing force equal to the area of the poppet valve stem 58 multiplied by the pressure of the working fluid.

Prior to the time piston 13 reaches top dead center, the cam-operated poppet valve 54 is opened by cam 57 to allow the heated, pressurized liquid working fluid into the working chamber 14. After top dead center, the heated, pressurized liquid presses against the working face 38 of working head 50 to force piston 13 to move leftwardly, as viewed in FIG. 8a. After piston 13 has travelled through a significant portion of the power stroke e.g., about 25 to 50 percent after top dead center, the cam-operated poppet valve 54 closes, stopping further flow of the hot pressurized liquid working fluid into the working chamber 14. A small portion of the hot liquid working fluid within chamber 14 spontaneously vaporizes to continue the application of pressure against the working surface 38 of the working head 50. As the piston 13 moves to about 10% before bottom dead center, exhaust ports 24 are exposed in a two-cycle uniflow configuration, as shown in FIG. 8b, to allow the majority of the liquid and vaporized working fluid to discharge there through into the chamber 41 within the preheat exchanger 27.

During the power stroke shown in FIG. 8a, the pump head 51 compresses low temperature liquid working fluid in pump chamber 15, and when the pressure thereof exceeds the system pressure level, exhaust valve 34 (a check valve) is opened by ball 62 being lifted off of its seat 63 to thereby discharge the compressed liquid through exhaust ports 35 and conduit 36 into the tubes 42 of the preheat exchanger 27 where the pressurized low temperature working fluid is preheated by the exhaust working fluid discharged from the working chamber 14.

As shown in FIG. 8b, on the return stroke of piston 13, exhaust check valve 34 closes, and intake poppet valve 30 opens allowing low temperature low pressure liquid working fluid to be inducted into the pump chamber 15. The force to return piston 13 to the first position where the working head 50 is at or close to the top dead center is preferably supplied by an opposing piston of an identical engine in a two-cylinder configuration acting through the piston rod 16, as shown in FIGS. 9 and 10, or by a flywheel in a single cylinder configuration.

The cylinder generally includes a working end valve housing and end cap 60, working end cylinder wall 66, flange mounts 67, a trunnion mount 70 containing the exhaust ports 24, pump end cylinder walls 71, and pump end valve housing and rod end closure 72. It will be appreciated that the working piston head 50 and the adjacent working end valve housing 60 are at a relatively high temperature as compared to the pump piston head 51 adjacent to the pump valve housing 72. By the use of plastics, glass, ceramics or other materials having a low thermal conductivity in the construction of the piston parts, particularly the heads 50 and 51 and thermal spacer 52, this advantageous temperature differential may be maintained. If significant quantities of heat are allowed to be conducted to the pump chamber 15, the temperature of the working fluid therein would rise and the specific volume thereof would increase, thereby reducing the mass of liquid working fluid pumped each stroke.

While the present invention has been described using a piston pump in the same or a different cylinder from the working end space, it will be appreciated that if required, any other type of pump may be used, for example, a rotary pump.

FIGS. 9 and 10 show a system in accordance with the present invention for converting the output of a pair of opposing engines into mechanical energy. The system comprises two opposing engines 10R and 10L of the type shown in FIGS. 8a and 8b operating generally in the manner previously described.

The opposing piston rods 16R and 16L of the engines 10R and 10L are connected to a common cross head and slider assembly 88. Connecting rods 89 and 90 pivotally connect to opposite ends of the cross head assembly 88 and to crank pins attached to drive gears 91 and 92 which are meshed with driven gears 93 and 94 directly attached to output shafts 95 and 96. Flywheels 97 and 98 mounted on the shafts 95 and 96 smooth out rotational movement thereof. The drive gears 91 and 92 typically turn about 60-100 rpm so a gear ratio of about 5:1 is needed to operate, for example, an electric generator. Because the engines 10R and 10L provide very high torque, a chain and sprocket drive may be preferred over the gears 91, 92, 93 and 94.

The cylinders 11R and 11L of the two engines 10R and 10L are mounted to two wide flange "I" beams 100 and 101 by means of trunnion shafts 102R, 102L, 103R and 103L which are part of the trunnion housings 70R and 70L. The trunnion shafts 1 means of trunnion shafts 102R, 102L, 103R and 103L which are part of the trunnion housings 70R and 70L. The trunnion shafts 102R, 102L, 103R and 103L are supported by pillow block assemblies 104R, 104L, 105R and 105L. With this arrangement, the power stroke of one engine causes the piston of the other engine to return to its position at or near top dead center.

Each of the engines 10R and 10L is provided with its own primary heat exchanger 21R and 21L, preheat exchanger 27R and 27L, and cold reservoir 32R and 32L. As shown in FIGS. 9 and 10, cold liquid working fluid is pumped from the shell of the cold reservoir liquid-liquid countercurrent heat exchanger 32R and 32L by the pump ends 23R and 23L of the cylinders 11R and 11L through pipes 32R and 33L. Upon discharge from pump ends 23R and 23L, the cold pressurized liquid working fluid is discharged through pipes 36R and 36L to the small bore tubes within the preheat exchangers 27R and 27L. After passing through the liquid-liquid countercurrent tube-in-shell heat exchangers 27R and 27L, the preheated pressurized liquid working fluid communicates through pipes 37R and 37L with the small bore tubes of the primary heat exchangers 21R and 21L, which are also tube-in-shell liquid-liquid countercurrent heat exchangers. After passing through the small bore tubes in the primary heat exchangers 21R and 21L, the liquid working fluid pressure and temperature will be raised to its operating levels, which are usually below the critical temperature for the working fluid used. The pressurized heated liquid working fluid communicates to the inlet ends 60R and 60L of the working ends of the cylinders 11R and 11L through pipes 22R and 22L. The primary heat exchangers 21R and 21L are supplied with heated fluid from an external heat source (not shown) through their shell inlets 84R and 84L and is discharged through their outlets 83R and 83L to be reheated and recycled.

While it is contemplated that this invention will utilize nearly standard tube-in-shell countercurrent heat exchangers, this does not preclude the use of other types of heat exchangers, for example, a double-pipe heat exchanger with small bore U-tube bundles.

Figure 11:
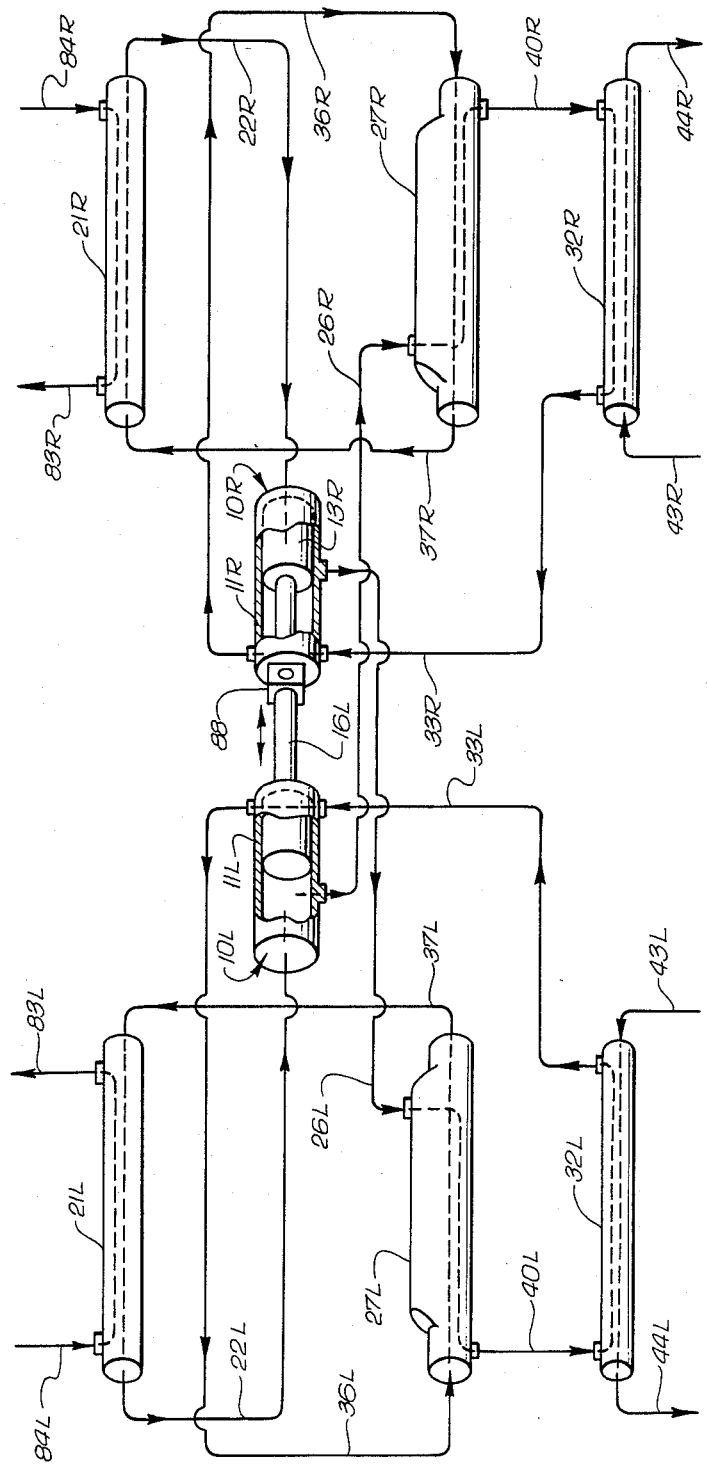
FIG. 11 is a schematic diagram of the arrangement shown in FIGS. 9 and 10.

The structures and operations described above with respect to FIGS. 9 and 10 can be more fully understood by reference to the schematic diagram of FIG. 11. Components shown in FIG. 11 which correspond to components shown in FIGS. 9 and 10 have been given identical reference numbers and components hidden or broken away in the views of FIGS. 9 and 10 have been shown in FIG. 11.

FIGS. 12a and 12b illustrated another embodiment of the engine 10' wherein the trunnion mount 70' has been modified from its dual purpose as an exhaust port housing as shown in FIGS. 8a and 8b. A new cam operated poppet type exhaust valve 24' is shown. The inlet valve 54' has also been modified to a piston type valve, as compared to the balanced poppet type valve 54 shown in FIGS. 8a and 8b. Because the uniflow configuration of FIGS. 8a and 8b has been modified, the sealing piston rings 53 are not required for piston 51'. To assist in the support of the piston 13', a wear ring 69 is installed in the trunnion housing 70'. This wear ring 69 can be made from many different materials, for example, bronze, babbitt, nylon, teflon, graphite, etc. It will be appreciated that other types of valve mechanisms may also be used if desired. The engine 10' is operationally safe because it is designed to insure that all liquid is scavenged out of the working space during exhaust.

Figure 13:
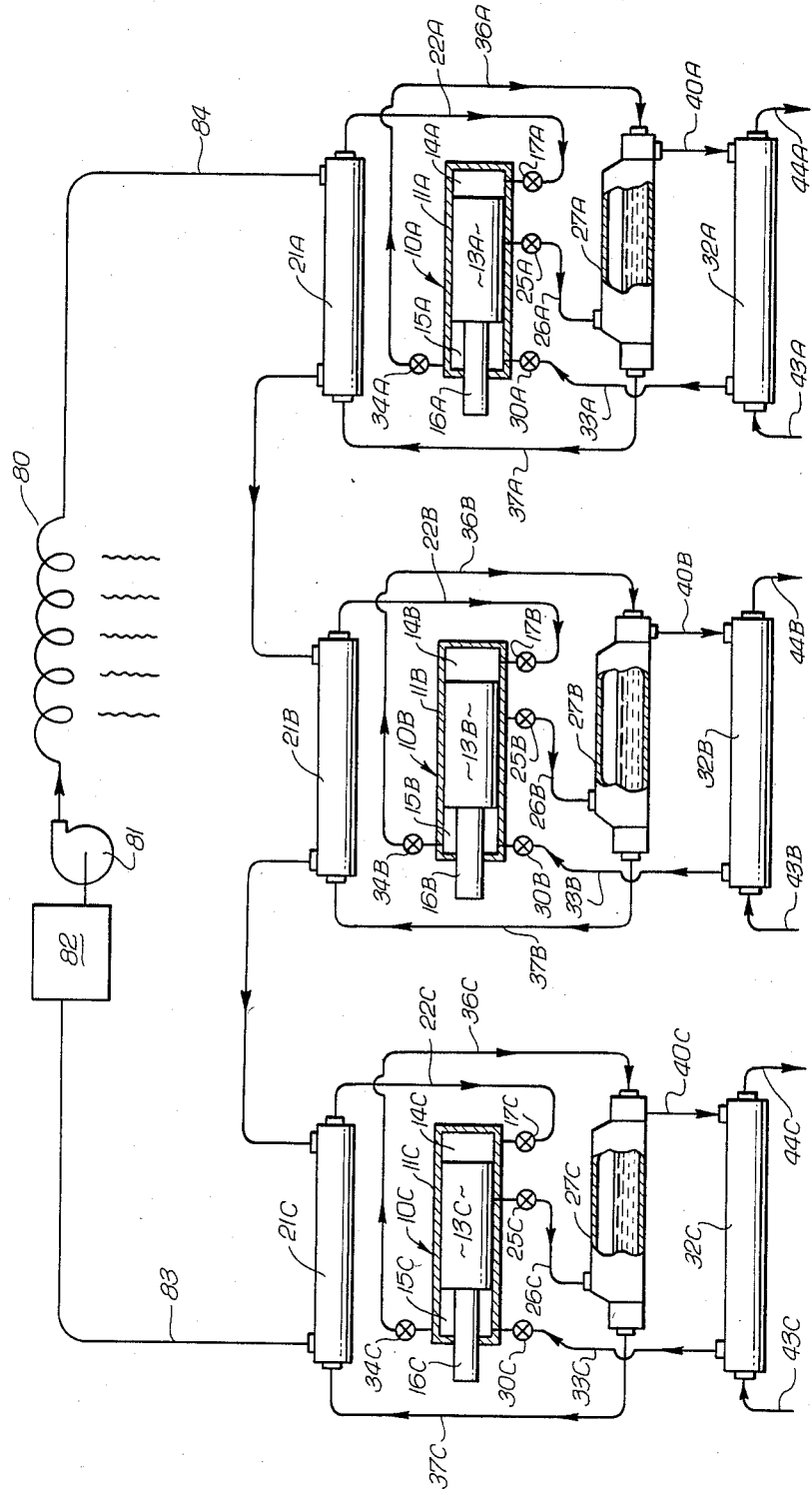
FIG. 13 is a schematic diagram of a cascaded series of interconnected engines of the type shown in FIG. 1.

FIG. 13 is a schematic flow diagram showing a cascade recycling circuit including several engines 10A, 10B and 10C of the type shown in FIG. 1. In each engine, the heat transfer fluid for the primary heat exchanger is received and used in the primary heat exchanger of the downstream engine. As shown in the Figure, after the heat transfer fluid has passed through the primary heat exchanger 21A of the first engine 10 A, it is passed to the primary heat exchanger 21B of the next downstream engine 10B, and finally, after passing through that heat exchanger 21B, the heat transfer fluid is passed to a primary heat exchanger 21C of the last downstream engine 10C. The upstream engine 10A may use water as the working fluid, the next downstream engine 10B may use a lower boiling working fluid such as ammonia (critical temperature 133° C.—pressure 114 bars), and the last downstream engine 10C may use freon refrigerant as the working fluid which has even lower critical temperatures than the ammonia. This cascading process is analagous to a compound steam engine in that it utilizes the maximum sensible heat energy from the heat transfer fluid.

While the invention has been described with reference to specific embodiments, the exact nature and scope of the invention is defined in the following claims.

What is claimed is:

1. A hydraulic external heat source engine comprising:
   an engine housing having an interior chamber therein;
   a working member disposed in the interior chamber to define in part a working chamber, the working member being displaceable from a first position to a second position in the interior chamber;
   an external heat source for providing relatively hot, high pressure liquid working fluid;
   means for directing the hot, high pressure working fluid from the external heat source to the working chamber in the liquid state to displace the working member from the first position towards the second position;
   means for terminating the flow of hot, high pressure liquid working fluid into the working chamber at a predetermined displacement of the working member, the hot, high pressure liquid working fluid in the working chamber vaporizing after said termination of flow to develop sufficient pressure within the working chamber to further displace the working member to the second position; and
   means for exhausting the working fluid from the working chamber before returning the working member to the first position.

2. The engine of claim 1 wherein the working member is a piston adapted for linear reciprocating movement within the interior chamber.

3. The engine of claim 2 wherein the piston divides the interior chamber into a working chamber at one end thereof and a pump chamber at the other end thereof, the piston being provided with a working face which in part defines the working chamber and with a pump face which defines in part the pump chamber.

4. The engine of claim 1 wherein the working member further defines a pump chamber on the opposite side thereof of said working chamber, and further including a source of relatively low temperature, low pressure liquid working fluid, means for directing the low temperature low pressure liquid working fluid from the source thereof to the pump chamber as the working member moves from the second poition to the first position, the liquid in the pump chamber being compressed as the working member is displaced from the first position to the second position, and means for releasing low temperature, high pressure liquid working fluid from the pump chamber.

5. The engine of claim 1 wherein the external heat source comprises a heat source, first heat exchanger means for communicating heat from said heat source to a heat transfer medium, second heat exchanger means for communicating said heat from the heat transfer medium to a liquid working fluid to produce said hot, high pressure liquid working fluid.

6. The engine of claim 5 wherein the heat source comprises hot fluid gas.

7. The engine of claim 6 wherein the first heat exchanger comprises a heat exchange chamber, a spray nozzle mounted on the heat exchange chamber for spraying liquid heat transfer medium into the heat exchange chamber, baffles positioned in the heat exchange chamber for directing the heat transfer medium therethrough, gas inlet means for introducing hot flue gas into the heat exchange chamber in contact with said heat transfer medium to transfer heat from said gas to said heat transfer medium, gas outlet means for releasing flue gas from the heat exchange chamber, and liquid outlet means for releasing heated heat transfer medium from the heat exchange chamber.

8. The engine of claim 4 wherein the source of low temperature, low pressure liquid working fluid comprises a preheat exchanger connected to the means for exhausting working fluid from the working chamber for receiving exhausted hot working fluid from said working chamber, first conduit means connected to the means for releasing working fluid from the pump chamber for directing said high pressure working fluid from the pump chamber through the preheat exchanger in heat exchange with said exhausted hot working fluid therein, a cold reservoir exchanger in communication with the preheat exchanger for receiving said exhausted working fluid therefrom, means for passing cooling medium through the cold reservoir exchanger in heat exchange with said exhausted working fluid, said cold reservoir exchanger being connected to the means for directing working fluid to the pump chamber for directing said exhausted working fluid from said cold reservoir exchanger into said pump chamber.

9. The engine of claim 8 wherein the preheat exchanger comprises a tube-in-shell liquid-liquid countercurrent heat exchanger, said conduit means comprising the tubes therein being located in an expansion chamber defined by the shell thereof, said exhausted working fluid being received in said expansion chamber.

10. The engine of claim 8 wherein the cold reservoir exchanger comprises a tube-in-shell liquid-liquid countercurrent heat exchanger, said exhausted working fluid being directed through tubes therein.

11. The engine of claim 8 wherein the external heat source for providing relatively hot working fluid comprises a primary heat exchanger in communication with the first conduit means for receiving said high pressure working fluid directed through the preheat exchanger.

12. The engine of claim 11 wherein the primary heat exchanger comprises a tube-in-shell liquid-liquid countercurrent heat exchanger, said high pressure working fluid being directed through the tubes therein.

13. The engine of claim 4 further comprising means for communicating said high pressure working fluid released from the pump chamber to said external heat source, the external heat source comprising means for heating said released high pressure working fluid to produce said hot, high pressure liquid working fluid.

14. The engine of claim 1 wherein the liquid working fluid provided by said external heat source is water at an approximate maximum temperature of about 370° C. and a pressure of about 220 bars.

15. The engine of claim 1 wherein the terminating means terminates said flow of working fluid when said working member is displaced between about 25 percent to 50 percent of the distance between said first position and said second position.

16. The engine of claim 4 wherein the working fluid from said source of low temperature, low pressure liquid working fluid is water at about atmospheric temperature and pressure.

17. The engine of claim 13 wherein the means for releasing working fluid from the pump chamber and the means for directing working fluid to the working chamber comprises check valves which remain closed while said working member is displaced from the second position to the first position.

18. The engine of claim 1 wherein the exhausting means exhausts working fluid from the working chamber when said working member is about 90 percent of the distance from said first position to said second position.

19. The engine of claim 1 having a compression ratio in excess of 30:1.

20. The engine of claim 1 wherein the engine housing and working member are formed of material selected from the group consisting of plastic, ceramic, glass, and metals.

21. The engine of claim 1 wherein the working fluid is selected from the group consisting of water and refrigerants.

22. The engine of claim 3 wherein the piston comprises a working face exposed to the working chamber and a pump face exposed to the pump chamber, said working face and pump face being connected by a thermal spacer extending therebetween, and the means for terminating the flow of working fluid into the working chamber comprises a cam-operated inlet valve.

23. The engine of claim 4 wherein the means for releasing working fluid from the pump chamber comprises an exhaust check valve and the means for directing working fluid to the pump chamber comprises an inlet check valve.

24. The engine of claim 1 further comprising:
a second engine housing having a second interior chamber therein;
a second working member disposed in the second interior chamber to define in part a second working chamber, the second working member being displaceable from a first position to a second position in the second interior chamber;
a second external heat source for providing relatively hot, high pressure liquid working fluid;
second means for directing the hot, high pressure working fluid from the second external heat source to the second working chamber in the liquid state to displace the second working member from the first position towards the second position;
second means for terminating the flow of hot high pressure liquid working fluid into the second working chamber at a predetermined displacement of the second working member, the hot, high pressure liquid working fluid in the second working chamber vaporizing after said termination of flow to develop sufficient pressure within the second working chamber to further displace the second working member to the second position; and
second means for exhausting the working fluid from the second working chamber before returning the second working member to the first position, said working member and second working member being arranged in an opposing configuration so that the displacement of one of said working members from the first position to the second position displaces the other of said working member from the second position to the first position.

25. The engine of claim 24 wherein the working member and second working member are operatively interconnected to a drive assembly for actuating said drive assembly upon displacement of said working members.

26. The engine of claim 1 further comprising:
a second engine housing having a second interior chamber therein;
a second working member disposed in the second interior chamber to define in part a second working chamber, the second working member being displaceable from a first position to a second position in the second interior chamber;
a second external heat source for providing a second relatively hot, high pressure liquid working fluid;

second means for directing the second hot, high pressure working fluid from the second external heat source to the second working chamber in the liquid state to displace the second working member from the first position towards the second position;

second means for terminating the flow of second hot, high pressure liquid working fluid into the second working chamber at a predetermined displacement of the second working member, the second hot, high pressure liquid working fluid in the second working chamber vaporizing after said termination of flow to develop sufficient pressure within the second working chamber to further displace the second working member to the second position; and second means for exhausting the second working fluid from the second working chamber before returning the second working member to the first position, said external heat source comprising heat exchanger means for communicating heat from a heat transfer medium to the liquid working fluid;

said second external heat source comprising second heat exchanger means for receiving said heat transfer medium from the heat exchanger means and communicating heat therefrom to the second fluid working fluid.

27. The engine of claim 26 wherein the working fluid has a higher critical temperature than the second working fluid.

28. A method of converting the energy of a high temperature, high pressure liquid working fluid into useful mechanical energy comprising:

directing relatively high temperature, high pressure liquid working fluid from an external heat source into a working chamber of an engine housing having a displaceable working member disposed therein, the liquid working fluid driving the working member from a first position toward a second position;

terminating the flow of high temperature, high pressure liquid working fluid to the working chamber at a predetermined displacement of the working member, liquid working fluid within the working chamber vaporizing after said terminating to develop sufficient pressure within the working chamber to further displace the working member toward the second position; and exhausting the working fluid from the working chamber before returning the working member to the first position.

29. The method of claim 28 wherein the liquid working fluid directed to the working chamber is at a temperature exceeding the boiling point of the liquid at atmospheric pressure.

30. The method of claim 29 wherein the liquid working fluid is selected from the group consisting of water and refrigerants.

31. The method of claim 28 further comprising directing relatively low temperature, low pressure working fluid from a source thereof to a pump chamber of the engine as the working member moves from the second position to the first position, the low temperature, low pressure liquid working fluid in the pump chamber being compressed when the working member is displaced from the first position to the second position.

32. The method of claim 31 further comprising discharging the low temperature, high pressure liquid working fluid from the pump chamber into a preheat exchanger in heat exchange with high temperature working fluid discharged from the working chamber to thereby raise the temperature of the low temperature liquid working fluid and decrease the temperature of the high temperature working fluid.

33. The method of claim 32 further comprising directing the heated high pressure liquid working fluid from the preheat exchanger to a primary heat exchanger wherein the temperature and pressure of the working fluid are raised to operating levels.

34. The method of claim 32 further comprising directing the cooled working fluid from the preheat exchanger into a cold reservoir exchanger in heat exchange with a cooling medium therein, and directing working fluid from the cold reservoir exchanger into said pump chamber of the engine.

35. The method of claim 31 further comprising directing the working fluid from the pump chamber to said external heat source to produce said high temperature, high pressure liquid working fluid.

* * * * *

UNITED STATES PATENT AND TRADEMARK OFFICE
CERTIFICATE OF CORRECTION

PATENT NO. : 4,747,271

DATED : May 31, 1988

INVENTOR(S) : Victor H. Fischer

It is certified that error appears in the above-identified patent and that said Letters Patent is hereby corrected as shown below:

Column 1, line 57, change "K." to -- K --.
Column 1, line 57, change "R." to -- R --.
Column 1, lines 60-61, change "K." to -- K --, and "R." to -- R -- (all occurrences).
Column 1, line 65, change "and" to -- are --.

Column 2, line 3, change "freon" to -- Freon --.
Column 2, line 9, change "empiricaly" to -- empirically --.

Column 3, line 6, change "vaporised" to -- vaporized --.
Column 3, line 13, change "heat" to -- heated --.
Column 3, line 19, change "cut-off" to -- cut off --.
Column 3, line 39, change "counter-current" to -- countercurrent --.

Column 4, line 6, change "super-heating" to -- superheating --.
Column 4, line 57, change "freon" to -- Freon --.
Column 4, line 64, change "pick-up" to -- pick up --.

Column 5, line 6, change "combination" to -- combustion --.
Column 5, line 23, change "polytetrafluroethylene" to -- polytetrafluoroethylene --.
Column 5, line 26, change "an" to -- and --.

Column 6, line 39, change "exhausted working fluid" to -- exhaust fluid --.
Column 6, line 46, change "exchanger" to -- exchange --.
Column 6, line 58, after "other" insert -- and --.

Column 7, line 47, before "the" insert -- of --.
Column 7, line 57, change "turned-on" to -- turned on --.

UNITED STATES PATENT AND TRADEMARK OFFICE
CERTIFICATE OF CORRECTION

PATENT NO. : 4,747,271

DATED : May 31, 1988

INVENTOR(S) : Victor H. Fischer

It is certified that error appears in the above-identified patent and that said Letters Patent is hereby corrected as shown below:

Column 8, line 2, change "desireable" to -- desirable --.
Column 8, line 19, change "siding" to -- sliding --.

Column 10, line 10, change "valve 17 and," to
                    -- valve 17, and --.
Column 10, line 26, change "shown" to -- shows --.
Column 10, line 40, change "C.." to -- C. --.
Column 10, line 41, change "exists" to -- exit --.
Column 10, line 61, change "ie.," to -- i.e., --.

Column 11, line 1, change "(b)-(e)" to -- b-e --.
Column 11, line 44, change "(a)" to -- a --.
Column 11, line 60, change "(a) and (b)" to -- a and b --.
Column 11, line 61, change "(b)-(e)" to -- b-e --.

Column 12, line 25, after "cold" delete "working".

Column 13, line 23, after "stroke" insert a comma.
Column 13, line 34, change "there through" to
                    -- therethrough --.
Column 13, lines 52,53, change "top dead center" to
                    -- Top Dead Center --.

Column 14, line 37, after "shafts" delete "1 means of trunnion shafts".
Column 14, line 38-40, after "103L" delete "which are part of the trunnion housings 70R and 70L. The trunnion shaft 102R, 102L, 103R, and 103L".
Column 14, line 52, change "32R" to -- 33R --.

Column 15, line 20, change "illustrated" to -- illustrate --.

UNITED STATES PATENT AND TRADEMARK OFFICE
CERTIFICATE OF CORRECTION

PATENT NO. : 4,747,271

DATED : May 31, 1988

INVENTOR(S) : Victor H. Fischer

It is certified that error appears in the above-identified patent and that said Letters Patent is hereby corrected as shown below:

Column 15, lines 45-46, change "10 A" to -- 10A --.

Column 16, line 39, change "poition" to -- position --.

Column 19, line 25, after "second" delete "fluid".
Column 19, line 44, change "terminating" to -- termination --.

Signed and Sealed this

Twelfth Day of December, 1989

Attest:

JEFFREY M. SAMUELS

Attesting Officer     Acting Commissioner of Patents and Trademarks